(12) United States Patent
Leske et al.

(10) Patent No.: US 9,344,677 B1
(45) Date of Patent: May 17, 2016

(54) CONTENT SHARING SYSTEM AND METHOD

(71) Applicant: Google Inc., Mountain View, CA (US)

(72) Inventors: Matthew J. Leske, Stockholm (SE); Christopher P. D. Johnson, San Bruno, CA (US); Jeremy Ng, Redmond, WA (US); Kathryn Cushing, San Francisco, CA (US)

(73) Assignee: Google Inc., Mountain View, CA (US)

( * ) Notice: Subject to any disclaimer, the term of this patent is extended or adjusted under 35 U.S.C. 154(b) by 294 days.

(21) Appl. No.: 14/039,231

(22) Filed: Sep. 27, 2013

Related U.S. Application Data

(60) Provisional application No. 61/803,407, filed on Mar. 19, 2013.

(51) Int. Cl.
*H04N 7/15* (2006.01)
*G06T 1/00* (2006.01)
*G06F 21/62* (2013.01)

(52) U.S. Cl.
CPC ..................... *H04N 7/15* (2013.01)

(58) Field of Classification Search
CPC combination set(s) only.
See application file for complete search history.

(56) References Cited

U.S. PATENT DOCUMENTS

| | | | |
|---|---|---|---|
| 5,778,053 A * | 7/1998 | Skarbo | H04M 11/10 348/14.06 |
| 5,959,622 A * | 9/1999 | Greer | H04N 7/147 348/E7.081 |
| 7,370,364 B2 | 5/2008 | Dobbins et al. | |
| 7,841,012 B2 | 11/2010 | Huang | |
| 8,279,780 B2 | 10/2012 | Yamamoto | |
| 8,533,857 B2 | 9/2013 | Tuchman et al. | |
| 2004/0240650 A1 * | 12/2004 | Bear | H04M 1/575 379/142.01 |
| 2006/0294598 A1 | 12/2006 | Lam et al. | |
| 2008/0040815 A1 | 2/2008 | Huang | |
| 2008/0052784 A1 | 2/2008 | Wiley et al. | |
| 2008/0072334 A1 | 3/2008 | Bailey et al. | |
| 2010/0076600 A1 * | 3/2010 | Cross | H04N 7/15 700/259 |
| 2011/0167501 A1 | 7/2011 | Cho et al. | |
| 2012/0266258 A1 | 10/2012 | Tuchman et al. | |
| 2012/0324589 A1 | 12/2012 | Nukala et al. | |
| 2012/0327176 A1 * | 12/2012 | Kee | H04N 7/15 348/14.08 |
| 2013/0014281 A1 | 1/2013 | Cheah | |
| 2013/0014282 A1 | 1/2013 | Cheah | |
| 2013/0024949 A1 | 1/2013 | Baldwin et al. | |
| 2013/0205408 A1 | 8/2013 | Yerli | |
| 2014/0041054 A1 | 2/2014 | Yalcinalp et al. | |
| 2014/0047560 A1 | 2/2014 | Meyer et al. | |
| 2014/0096266 A1 | 4/2014 | Hoard et al. | |
| 2014/0123313 A1 | 5/2014 | Belvin et al. | |
| 2014/0123318 A1 | 5/2014 | Belvin et al. | |
| 2014/0283128 A1 | 9/2014 | Shepherd et al. | |
| 2014/0304836 A1 | 10/2014 | Velamoor et al. | |

OTHER PUBLICATIONS

Notice of Allowance dated Nov. 21, 2014 for related U.S. Appl. No. 14/039,308.

* cited by examiner

*Primary Examiner* — Joseph J Nguyen

(57) ABSTRACT

A method and computing system for defining a group of participants for a videoconference. A request is received from a first participant of the videoconference to initiate an image capture utility, wherein the first participant is included within the group of participants. At least a portion of the group of participants is notified of the intent of the first user to initiate the image capture utility.

20 Claims, 3 Drawing Sheets

CONTENT SHARING SYSTEM AND METHOD

RELATED APPLICATION

This application claims the benefit of the following U.S. Provisional Patent Application Ser. No. 61/803,407, filed 19 Mar. 2013.

TECHNICAL FIELD

This disclosure relates to content sharing and, more particularly, to content sharing within a social media platform.

BACKGROUND

The Internet currently allows for the free exchange of ideas and information in a manner that was unimaginable only a couple of decades ago. One such use for the Internet is as a communication medium, whether it is via one-on-one exchanges or multi-party exchanges. For example, two individuals may exchange private emails with each other. Alternatively, multiple people may participate on a public website in which they may post entries that are published for multiple people to read. Examples of such websites may include but are not limited to product/service review sites and topical blogs.

One such use of the Internet is to allow people to videoconference with each other. As videoconferencing adds a video component to a communication session, such communication sessions tend to be more enjoyable for the participants. Unfortunately, the use of videoconferencing sometimes raises enhanced privacy concerns, as people tend to be more sensitive concerning content that includes their image.

SUMMARY OF DISCLOSURE

In one implementation, a computer-implemented method includes defining a group of participants for a videoconference. A request from a first participant of the videoconference is received to initiate an image capture utility, wherein the first participant is included within the group of participants. At least a portion of the group of participants are notified of the intent of the first user to initiate the image capture utility. Notifying at least a portion of the group of participants includes one or more of: providing an audible notification to at least a portion of the group of participants; providing a graphical notification to at least a portion of the group of participants; and providing a text-based notification to at least a portion of the group of participants.

One or more of the following features may be included. In response to notifying at least a portion of the group of participants, a request from a second participant of the videoconference may be received to hide a video stream associated with the second participant. The second participant may be included within the group of participants. The video stream associated with the second participant may be hidden. A delay period having a defined duration may be initiated and, upon the expiry of the delay period, the image capture utility may be initiated for use by the first participant of the videoconference.

In another implementation, a computer-implemented method includes defining a group of participants for a videoconference. A request is received from a first participant of the videoconference to initiate an image capture utility, wherein the first participant is included within the group of participants. At least a portion of the group of participants is notified of the intent of the first user to initiate the image capture utility.

One or more of the following features may be included. Notifying at least a portion of the group of participants may include one or more of: providing an audible notification to at least a portion of the group of participants; providing a graphical notification to at least a portion of the group of participants; and providing a text-based notification to at least a portion of the group of participants. In response to notifying at least a portion of the group of participants, a request from a second participant of the videoconference may be received to hide a video stream associated with the second participant, wherein the second participant is included within the group of participants. The video stream associated with the second participant may be hidden. A delay period having a defined duration may be initiated. Upon the expiry of the delay period, the image capture utility may be initiated for use by the first participant of the videoconference.

In another implementation, a computing system including a processor and memory is configured to perform operations including defining a group of participants for a videoconference. A request is received from a first participant of the videoconference to initiate an image capture utility, wherein the first participant is included within the group of participants. At least a portion of the group of participants is notified of the intent of the first user to initiate the image capture utility.

One or more of the following features may be included. Notifying at least a portion of the group of participants may include one or more of: providing an audible notification to at least a portion of the group of participants; providing a graphical notification to at least a portion of the group of participants; and providing a text-based notification to at least a portion of the group of participants. In response to notifying at least a portion of the group of participants, a request from a second participant of the videoconference may be received to hide a video stream associated with the second participant, wherein the second participant is included within the group of participants. The video stream associated with the second participant may be hidden. A delay period having a defined duration may be initiated. Upon the expiry of the delay period, the image capture utility may be initiated for use by the first participant of the videoconference.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
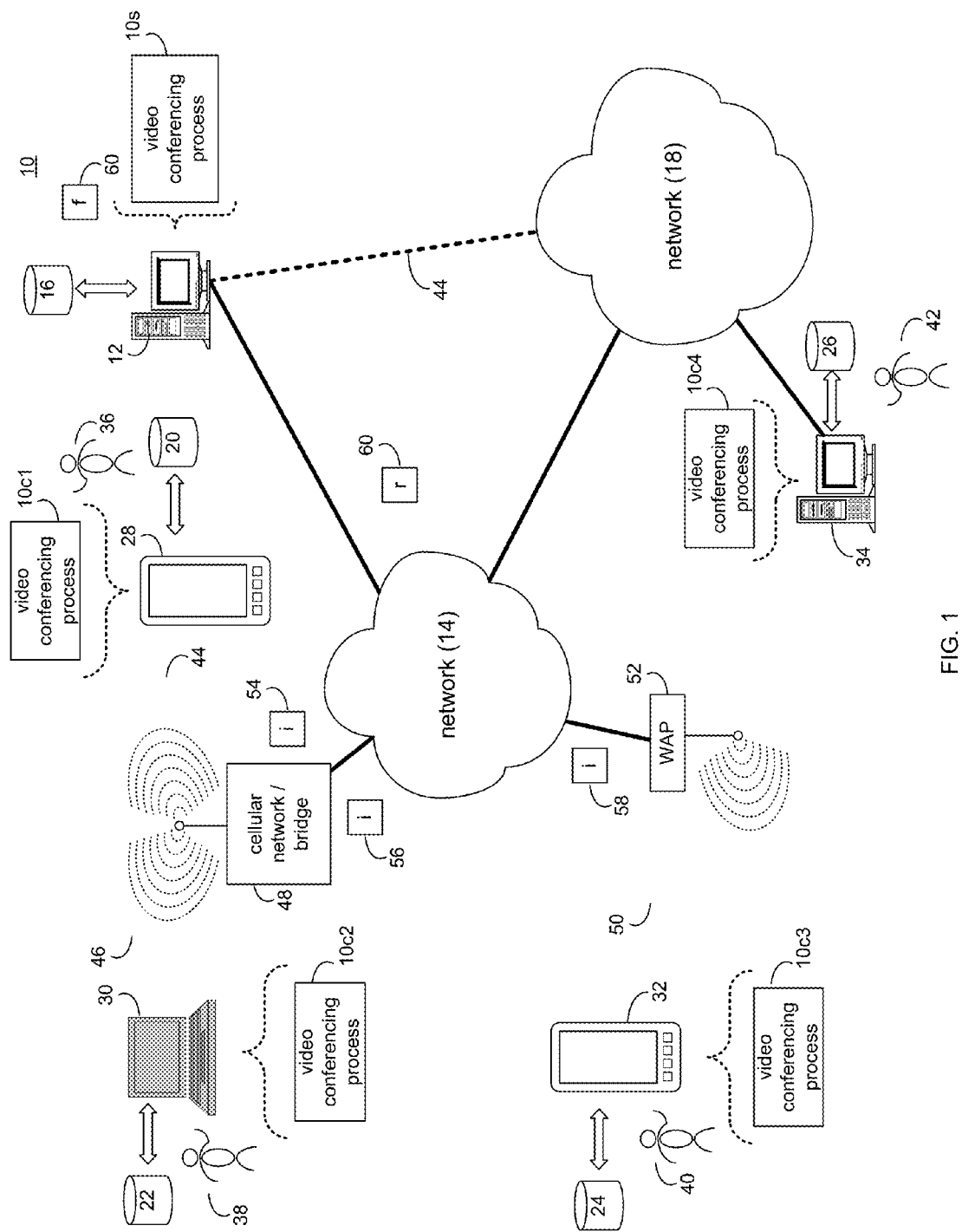
FIG. 1 is a diagrammatic view of a distributed computing network including a computing device that executes a videoconferencing process according to an implementation of the present disclosure.
Figure 2:
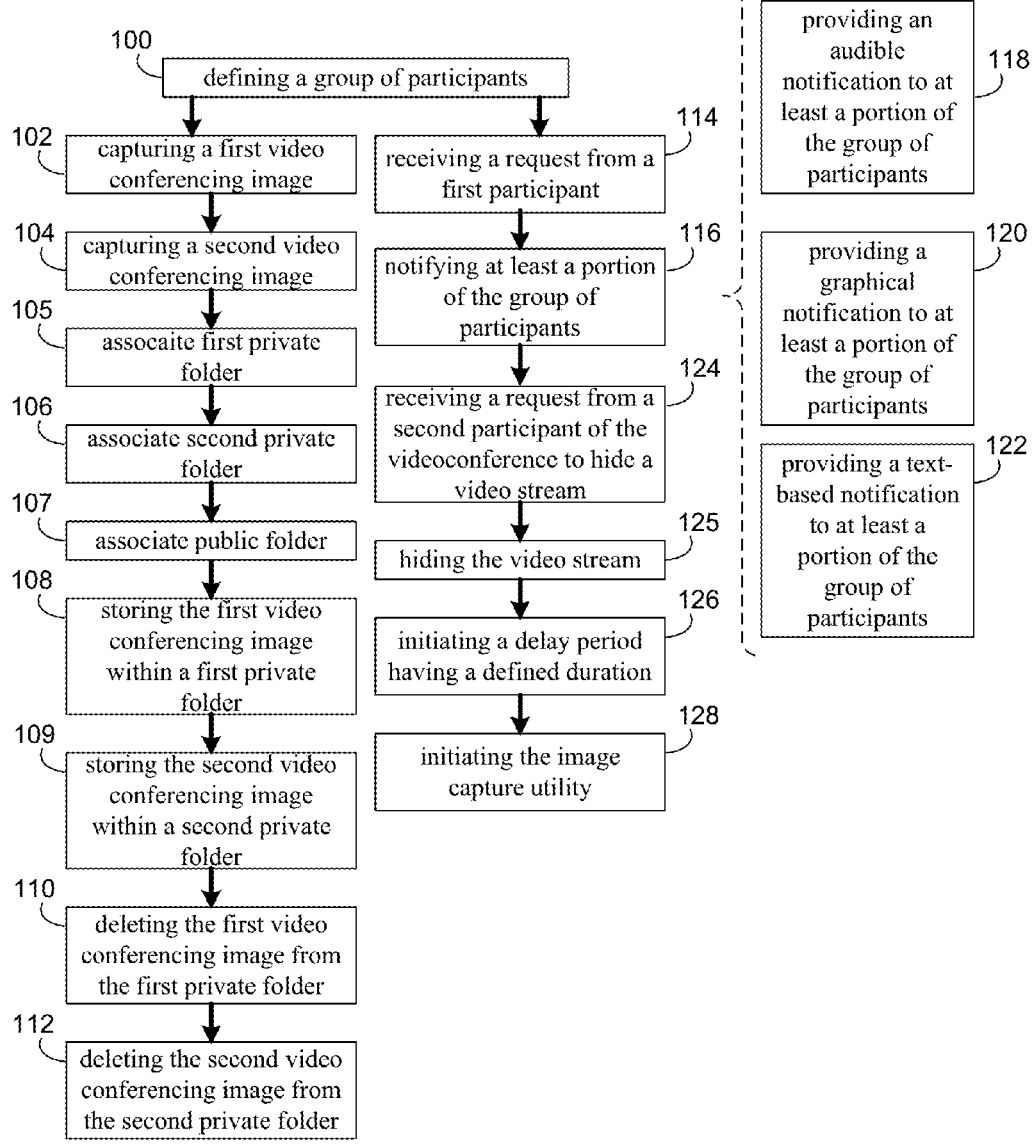
FIG. 2 is a flowchart of the videoconferencing process of FIG. 1 according to an implementation of the present disclosure.

In FIG. 1, there is shown videoconferencing process 10. Videoconferencing process 10 may be implemented as a server-side process, a client-side process, or a hybrid server-side/client-side process. For example, videoconferencing process 10 may be implemented as a purely server-side process via videoconferencing process 10s. Alternatively, videoconferencing process 10 may be implemented as a purely client-side process via one or more of videoconferencing process 10c1, videoconferencing process 10c2, videoconferencing process 10c3, and videoconferencing process 10c4. Alternatively still, videoconferencing process 10 may be implemented as a hybrid server-side/client-side process via videoconferencing process 10s in combination with one or more of videoconferencing process 10c1, videoconferencing process 10c2, videoconferencing process 10c3, and videoconferencing process 10c4. Accordingly, videoconferencing process 10 as used in this disclosure may include any combination of videoconferencing process 10s, videoconferencing process 10c1, videoconferencing process 10c2, videoconferencing process 10c3, and videoconferencing process 10c4.

Videoconferencing process 10s may be a server application and may reside on and may be executed by computing device 12, which may be connected to network 14 (e.g., the Internet or a local area network). Examples of computing device 12 may include, but are not limited to: a personal computer, a laptop computer, a personal digital assistant, a data-enabled cellular telephone, a notebook computer, a television with one or more processors embedded therein or coupled thereto, a server computer, a series of server computers, a mini computer, a mainframe computer, or a dedicated network device.

The instruction sets and subroutines of videoconferencing process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of videoconferencing processes 10c1, 10c2, 10c3, 10c4 may include but are not limited to a web browser, a game console user interface, a video conference user interface, or a specialized application (e.g., an application running on e.g., the Android™ platform or the iOS™ platform). The instruction sets and subroutines of videoconferencing processes 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, data-enabled, cellular telephone 28, laptop computer 30, personal digital assistant 32, personal computer 34, a notebook computer (not shown), a server computer (not shown), a gaming console (not shown), a television (not shown), a tablet computer (not shown) and a dedicated network device (not shown). Client electronic devices 28, 30, 32, 34 may each execute an operating system, examples of which may include but are not limited to Microsoft Windows™, Android™, WebOS™, iOS™, Redhat Linux™, or a custom operating system.

Users 36, 38, 40, 42 may access videoconferencing process 10 directly through network 14 or through secondary network 18. Further, videoconferencing process 10 may be connected to network 14 through secondary network 18, as illustrated with link line 44.

The various client electronic devices (e.g., client electronic devices 28, 30, 32, 34) may be directly or indirectly coupled to network 14 (or network 18). For example, data-enabled, cellular telephone 28 and laptop computer 30 are shown wirelessly coupled to network 14 via wireless communication channels 44, 46 (respectively) established between data-enabled, cellular telephone 28, laptop computer 30 (respectively) and cellular network/bridge 48, which is shown directly coupled to network 14. Further, personal digital assistant 32 is shown wirelessly coupled to network 14 via wireless communication channel 50 established between personal digital assistant 32 and wireless access point (i.e., WAP) 52, which is shown directly coupled to network 14. Additionally, personal computer 34 is shown directly coupled to network 18 via a hardwired network connection.

WAP 52 may be, for example, an IEEE 802.11a, 802.11b, 802.11g, 802.11n, Wi-Fi, and/or Bluetooth device that is capable of establishing wireless communication channel 50 between personal digital assistant 32 and WAP 52. As is known in the art, IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

As is known in the art, users of social networks may be able to participate in group communication sessions, such as multiuser videoconferences that allow for virtual gatherings of people so that they may chat about specific topics.

Figure 3:
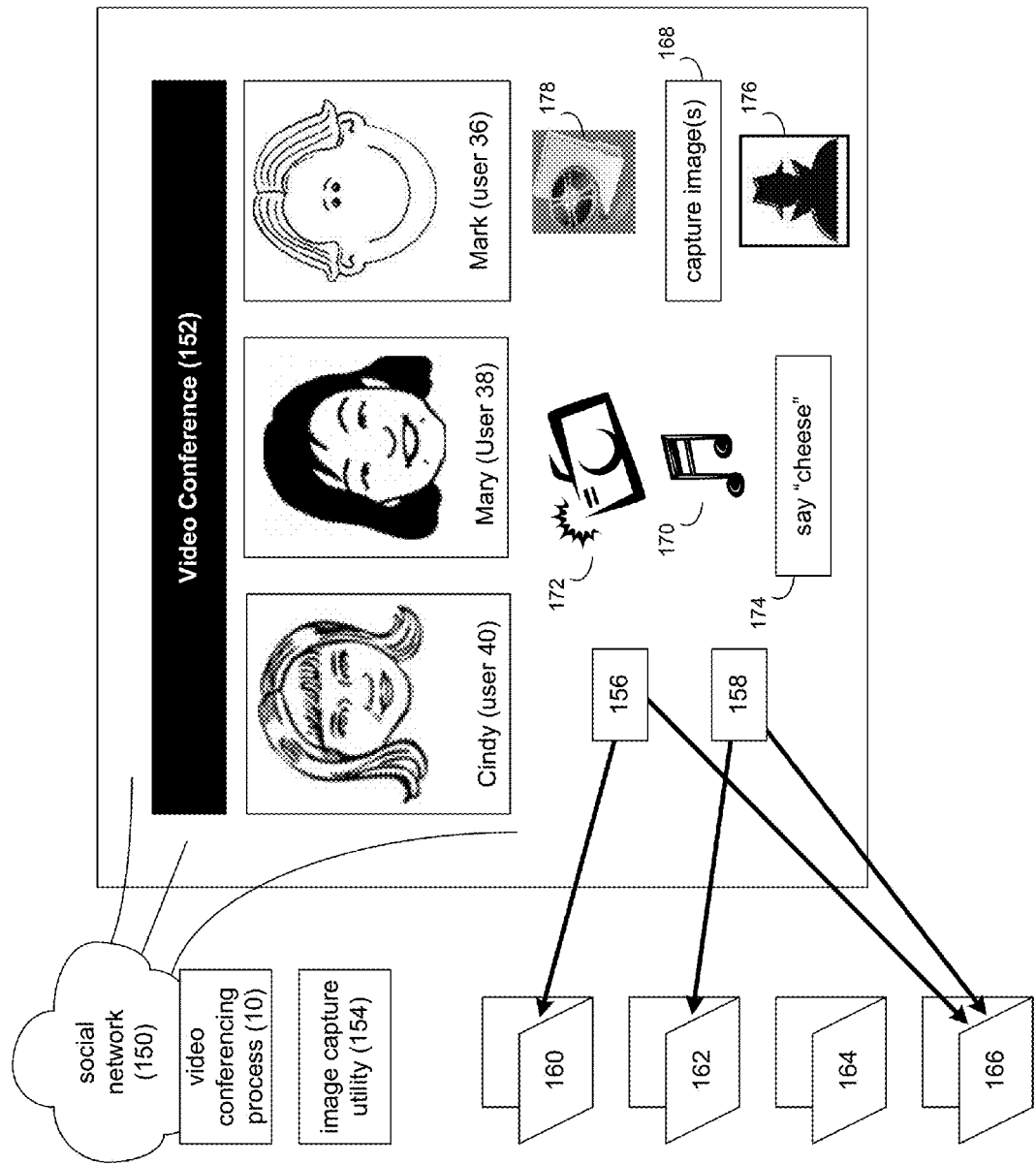
FIG. 3 is a diagrammatic view of a videoconference managed by the videoconferencing process of FIG. 1 according to an implementation of the present disclosure.

Referring also to FIG. 3, assume for illustrative purposes that users 36, 38, 40, 42 are all members of social network 150. Further assume that users 36, 38, 40 wish to participate in videoconference 152. While the following discussion concerns videoconference 152 being executed within social network 150, this is for illustrative purposes only and is not intended to be a limitation of this disclosure, as other configurations are possible. For example, videoconference 152 may occur outside of social network 150 by way of e.g. a stand-alone communications application/product (not shown). For illustrative purposes, further assume that videoconference 152 will occur through computing device 12, where (in this example) users 36, 38, 40 will access videoconference 152 via client electronic devices 28, 30, 32 (respectively). Further, assume that videoconference 152 (as used in this disclosure) is intended to cover any form of video transmission, such as peer-to-peer video transmission, peer-to-many video transmission, or communal video transmission.

Accordingly and continuing with the above-stated example, assume that users 36, 38, 40 each indicate (e.g. via client electronic devices 28, 30, 32 respectively) an intention to participate in videoconference 152, thus generating indications 54, 56, 58 respectively. Videoconferencing process 10 may receive an indication (e.g. indications 54, 56, 58) that users 36, 38, 40 (respectively) wish to participate in videoconference 152. Accordingly, videoconferencing process 10 may define 100 a group of participants for videoconference 152, wherein this group of participants includes (in this example) users 36, 38, 40.

Videoconferencing process 10 may be configured to allow for the capturing of images rendered within videoconference 152. For example, videoconferencing process 10 may include image capture utility 154 that may be configured to capture the imagery being rendered within video conference 152. For example, image capture utility 154 may be configured to function in a fashion similar to a screen capture utility.

Assume for illustrative purposes that image capture utility 154 is available for the group of participants (e.g., users 36, 38, 40) to utilize during videoconference 152. For illustrative purposes, assume that a first user and a second user within the group of participants (e.g., user 36, user 38, respectively) wish to capture video conferencing images during video conference 152. Examples of such video conferencing images may include, but are not limited to, video conferencing screen capture still images.

Accordingly, user 36 may initiate such a screen capture using e.g., image capture utility 154 via data-enabled, cellular telephone 28. In response to this initiation, videoconferencing process 10 may capture 102 first video conferencing image 156 for a first participant (e.g., user 36) of videoconference 152.

Further, user 38 may initiate such a screen capture using e.g., image capture utility 154 via laptop computer 30. In response to this initiation, videoconferencing process 10 may capture 104 second video conferencing image 158 for a second participant (e.g., user 38) of videoconference 152.

Videoconferencing process 10 may be configured to define a plurality of folders for use by the group of participants (e.g., users 36, 38, 40), which may be accessible via e.g., social network 150. Example of such folders may include, but are not limited to, private folders 160, 162, 164 and public folder 166. For example, video conferencing process 10 may: associate 105 first private folder 160 with user 36 so that only user 36 has access rights to private folder 160; associate 106 second private folder 162 with user 38 so that only user 38 has access rights to private folder 162; and associate third private folder 164 with user 40 so that only user 40 has access rights to private folder 164. Additionally, video conferencing process 10 may associate 107 public folder 166 with the group of participants (e.g., users 36, 38, 40) so that the group of participants (e.g., users 36, 38, 40) have access rights to public folder 166.

As the users utilize image capture utility 154 to generate the above-described video conferencing images, these video conferencing images may be stored within these various folders.

Continuing with the above-stated example, videoconferencing process 10 may store 108 first video conferencing image 156 within first private folder 160 associated 105 with the first participant (e.g., user 36) and public folder 166 associated 107 with the group of participants. Further, videoconferencing process 10 may store 109 second video conferencing image 158 within second private folder 162 associated with the second participant (e.g., user 38) and public folder 166 associated with the group of participants.

Accordingly, the group of participants (namely users 36, 38, 40) may browse their folders to see the video conferencing images they generated. Accordingly, any video conferencing images that user 36 generated are stored, by videoconferencing process 10, within first private folder 160. Further, any video conferencing images that user 38 generated are stored, by videoconferencing process 10, within second private folder 162. Additionally, any video conferencing images that user 40 generated are stored, by videoconferencing process 10, within third private folder 164.

Public folder 166 may be configured as a communal folder associated with videoconference 152. For example, it may be viewable as an event and/or photo collection within social network 150. Accordingly, any video conferencing images taken during video conference 152 (regardless of whether they were taken by e.g., user 36, user 38 or user 40) may be stored within public folder 166.

Videoconferencing process 10 may be configured to allow the users (e.g., users 36, 38, 40) to manage their individual video conferencing images. For example, the users (e.g., users 36, 38, 40) may delete one or more of their video conferencing images.

For example, in response to a request from the first participant (e.g., user 36) of videoconference 152, videoconferencing process 10 may delete 110 first video conferencing image 156 from first private folder 160 and public folder 166. Further and in response to a request from the second participant (e.g., user 38) of videoconference 152, videoconferencing process 10 may delete 112 second video conferencing image 158 from second private folder 162 and public folder 166. Accordingly, videoconferencing process 10 may be configured to delete one or more video conferencing images included within public folder 166 whenever the corresponding video conferencing image(s) are deleted from the private folder of the owner of the video conferencing image(s).

As discussed above, since videoconferencing adds a video component to a communication session, such communication sessions tend to be more enjoyable for the participants. Unfortunately, the use of videoconferencing sometimes raises enhanced privacy concerns, as people tend to be more sensitive concerning content that includes their image. Accordingly, videoconferencing process 10 may be configured in a manner that adds functionality to address such privacy concerns. For example and as will be discussed below, videoconferencing process 10 may be configured in a manner that allows users to prevent others from capturing their image via above-described image capture utility 154.

When typically configured, image capture utility 154 needs to be initiated by the individual users wishing to use the utility. For example, if a user wishes to initiate image capture utility, the user may e.g., select button 168, resulting in videoconferencing process 10 receiving 114 a request (e.g., request 60) from a first participant (e.g., user 36) of videoconference 152 to initiate image capture utility 154.

Upon receiving 114 request 60, videoconferencing process 10 may notify 116 at least a portion of the group of participants (e.g., users 38, 40) of the intent of user 36 to initiate image capture utility 154.

When notifying 116 at least a portion of the group of participants, videoconferencing process 10 may: provide 118 an audible notification to at least a portion of the group of participants (e.g., users 38, 40); provide 120 a graphical notification to at least a portion of the group of participants (e.g., users 38, 40); and/or provide 122 a text-based notification to at least a portion of the group of participants (e.g., users 38, 40).

For example, videoconferencing process 10 may provide 118 an audible "shutter" sound effect (e.g., sound effect 170) to users 38, 40 upon receiving 114 request 60 from user 36. Additionally/alternatively, videoconferencing process 10 may provide 120 a "screen flash" visual effect (e.g., visual effect 172) to users 38, 40 upon receiving 114 request 60 from user 36. Additionally/alternatively, videoconferencing process 10 may provide 122 a text-based notification (e.g., notification 174) to users 38, 40 upon receiving 114 request 60 from user 36

Videoconferencing process 10 may be configured to allow a user to prevent others from capturing their image. For example, videoconferencing process 10 may allow a user to hide their video feed so that it does not appear within videoconference 152. Accordingly, upon videoconferencing process 10 notifying 116 users 38, 40 of the intent of user 36 to initiate image capture utility 154, user 38, 40 may choose to hide their video stream. This may be accomplished e.g., by user 38, 40 selecting e.g., "anonymity" button 176.

Assume for illustrative purposes that user 38 does not wish to allow their image to be captured by image capture utility 154 and, therefore, selects "anonymity" button 176. Accordingly, if videoconferencing process 10 receives 124 such a request from a second participant (e.g., user 38) of videoconference 152 to hide their video stream, videoconferencing process 10 may hide 125 the video stream of user 38. The manner in which videoconferencing process 10 hides 125 the video stream of user 38 may vary depending upon implementation. For example, videoconferencing process 10 may be configured to blank out the video feed of user 38, thus preventing user 38 from being seen within videoconference 152. Alternatively, videoconferencing process 10 may be configured to allow the video feed of user 38 to be seen within videoconference 152 while preventing images from such a video feed from being captured by image capture utility 154. Further, videoconferencing process 10 may be configured to block the video stream at the sending client (e.g., laptop computer 30 for user 38).

Upon videoconferencing process 10 receiving 114 a request (e.g., request 60) from user 36 to initiate image capture utility 154, videoconferencing process 10 may initiate 126 a delay period having a defined duration before allowing e.g., user 36 to utilize image capture utility 154. For example, videoconferencing process 10 may initiate 126 a fifteen second delay to prevent user 36 from utilizing image capture utility 154 for fifteen second, thus allowing e.g., user 38, 40 to review and process the above-described notifications and have time to hide their video stream if they desire to do so.

Accordingly and upon the expiry of the above-described delay period, videoconferencing process 10 may initiate 128 image capture utility 154 for use by the first participant (e.g., user 36) of videoconference 152, thus allowing user 36 to capture video conferencing images of users 38, 40 (which, as discussed above, may be stored 108 within first private folder 160 associated with user 36 and public folder 166 associated with the group of participants of videoconference 152).

Further, whenever a new person (e.g., user 42) joins videoconference 52, the newly-joining user may be provided with the above-described notifications, thus informing them that one of more users in e.g., videoconference 152 are utilizing image capture utility 154 to capture video conferencing images. Additionally, the above-described time delay may be utilized to prevent image capture utility 154 from being used by any of the participants of videoconference 152 for e.g., the first fifteen seconds after a new user joins videoconference 152, thus preventing the capturing of video conferencing images (and e.g., images of new user 42) prior to user 42 being able to review and process the above-described notifications and have time to hide their video stream if they desire to do so. Alternatively, the delay may be longer and e.g., may last the entire duration of videoconference 152. Further, the delay may be configured to only prevent the capturing of video conferencing images with respect to new user 42, thus allowing image capture utility 154 to function properly with respect to users 38, 40.

Typically, the level of notification given to a user varies depending upon the number of times that they have seen the notifications. For example, the first time that a user enters into a videoconference in which another user is using e.g., screen capture utility 154, the user may be presented with a longer/higher-level detail description that explains the use/operation of screen capture utility 154. However, when the same user subsequently joins a video conference in which another user is using e.g., screen capture utility 154, the user may be presented with a shorter/lower-level detail description that explains the use/operation of screen capture utility 154.

As discussed above, videoconferencing process 10 may be configured in a manner that adds functionality to address privacy concerns. This configuration may be accomplished via videoconferencing process 10 applying various privacy enhancing rules. For example, video conferencing process 10 may be configured to define the above-described group of participants for a videoconference as all individuals who were invited to videoconference 152 (whether or not they actually attended) and all individuals who attended videoconference 152 (whether or not they were actually invited). All of these individual may be considered part of the above-described group of participants and, therefore, may be allowed to view the video conferencing images included within public folder 166.

Further, once a videoconference ends, the content within any associated public folders may be locked down and, therefore, not directly shareable with any additional individuals. Accordingly and for example, once videoconference 152 ends, the above-described group of participants may be fixed, no additional individuals may be added to the group of participants, and the video conferencing images included within public folder 166 may not be directly shared with any other individuals. While not directly shareable, the video conferencing images included within public folder 166 may be indirectly shared with additional individuals. For example, one or more individuals already included within a group of participants (regardless of whether or not the group has been locked down due to the completion of the related videoconference) may copy and reshare the video conferencing images included within public folder 166 with third party individuals.

As discussed above, videoconferencing process 10 may be configured to define a plurality of folders for use by the group of participants (e.g., users 36, 38, 40), which may be accessible via e.g., social network 150. Example of such folders may include, but are not limited to, private folders 160, 162, 164 and public folder 166. Video conferencing process 10 may be configured to allow members of the group of participants (e.g., users 36, 38, 40 with respect to video conference 152) to review and flag content included within e.g., public folder 166.

Flagging of Content Immediately: When video conferencing images are captured and shared within public folder 166, video conferencing process 10 may be configured to provide participants of video conference 152 (e.g., users, 36, 38, 40) with the ability to immediately flag video conferencing image(s) that are e.g., consider abusive within a number of categories (e.g., nudity, derogatory, profane). For example, users 36, 38, 40 may review the video conferencing image(s) include within public folder 166 (e.g., by selecting folder icon 178 from within video conference 152) and flag one or more of the video conferencing image(s).

Flagging of Content Once Shared in a Social Stream: As discussed above, public folder 166 may be configured to be accessible via e.g., social network 150. Further, if users 36, 38, 40 are members of social network 150, videoconferencing process 10 may be configured to publish the video conferencing image(s) included within public folder 166 to e.g., the social streams of users 36, 38, 40 within social network 150. Accordingly, video conferencing process 10 may be configured to provide participants of video conference 152 (e.g., users, 36, 38, 40) with the ability to flag video conferencing image(s) that are e.g., consider abusive within a number of categories (e.g., nudity, derogatory, profane) from within the above-described social streams.

Flagging of Content Regardless of Location: Video conferencing process 10 may be configured to provide participants of video conference 152 (e.g., users, 36, 38, 40) with the ability to flag video conferencing image(s) that are e.g., consider abusive within a number of categories (e.g., nudity, derogatory, profane) from whatever location they are viewable (e.g., from within a folder, from within a photo collection, from within a social stream, from within a videoconference).

Locking of Content Upon the Departure of a User: As discussed above, videoconferencing process 10 may be configured to share video conferencing image(s) generated during a videoconference with the above-described group of participants. However, videoconferencing process 10 may be configured to stop sharing with a user upon the user leaving the videoconference. Accordingly, if user 40 only participates in videoconference 152 for ten minutes during the middle of videoconference 152, the only video conferencing image(s) that will be viewable by user 40 within public folder 166 may be those generated during the ten minutes that user 40 participated.

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A non-transitory computer-readable medium coupled to one or more processors, the non-transitory computer-readable medium having instructions stored thereon, the instructions when executed causing the one or more processors to perform operations comprising:
    defining a group of participants for a videoconference;
    receiving a first request from a first participant of the videoconference to initiate an image capture utility during the videoconference, wherein the first participant is included within the group of participants;
    notifying at least a portion of the group of participants of an intent of the first participant to initiate the image capture utility,
    wherein notifying at least the portion of the group of participants includes one or more of:
        providing an audible notification to at least the portion of the group of participants
        providing a graphical notification to at least the portion of the group of participants
        providing a text-based notification to at least the portion of the group of participants;
    upon receiving the first request, initiating a delay period having a defined duration;
    receiving a second request from a second participant of the videoconference to hide a video stream associated with the second participant, wherein the second participant is included within the group of participants;
    in response to receiving the second request from the second participant, hiding the video stream associated with the second participant; and
    upon expiry of the delay period, initiating the image capture utility for use by the first participant during the videoconference.

2. The non-transitory computer-readable medium of claim 1, the instructions further causing the one or more processors to perform operations comprising:
    receiving a third request from a third participant of the videoconference to hide a video stream associated with the third participant, wherein the third participant is included within the group of participants.

3. The non-transitory computer-readable medium of claim 2, the instructions further causing the one or more processors to perform operations comprising:
    in response to receiving the third request, hiding the video stream associated with the third participant.

4. A computer-implemented method comprising:
    defining a group of participants for a videoconference;
    receiving a first request from a first participant of the videoconference to initiate an image capture utility during the videoconference, wherein the first participant is included within the group of participants;
    notifying at least a portion of the group of participants of an intent of the first participant to initiate the image capture utility;
    upon receiving the first request, initiating a delay period having a defined duration;
    receiving a second request from a second participant of the videoconference to hide a video stream associated with the second participant, wherein the second participant is included within the group of participants;
    in response to receiving the second request, hiding the video stream associated with the second participant; and
    upon expiry of the delay period, initiating the image capture utility for use by the first participant of the videoconference during the videoconference.

5. The computer-implemented method of claim 4 wherein notifying at least a portion of the group of participants includes:
    providing an audible notification to at least the portion of the group of participants.

6. The computer-implemented method of claim 4 wherein notifying at least a portion of the group of participants includes:
    providing a graphical notification to at least the portion of the group of participants.

7. The computer-implemented method of claim 4 wherein notifying at least a portion of the group of participants includes:
    providing a text-based notification to at least the portion of the group of participants.

8. The computer-implemented method of claim 4 further comprising:
    in response to notifying at least the portion of the group of participants, receiving a third request from a third participant of the videoconference to hide a video stream associated with the third participant, wherein the third participant is included within the group of participants.

9. The computer-implemented method of claim 8 further comprising:
    hiding the video stream associated with the third participant.

10. The computer-implemented method of claim 4 wherein the second request is received during the delay period having the defined duration.

11. The computer-implemented method of claim 4 wherein notifying at least a portion of the group of participants of the intent of the first participant to initiate the image capture utility comprises selecting a notification to present to each participant based on a number of times that the respective participant has been presented with a notification.

12. The computer-implemented method of claim 4 further comprising:
   initiating the delay period when a new participant joins the group of participants.

13. A computing system including at least one processor and a memory, the computing system configured to perform operations comprising:
   defining a group of participants for a videoconference;
   receiving a first request from a first participant of the videoconference to initiate an image capture utility during the videoconference, wherein the first participant is included within the group of participants;
   in response to receiving the first request from the first participant, initiating a delay period having a defined duration and notifying at least a portion of the group of participants of an intent of the first participant to initiate the image capture utility;
   during the delay period, receiving a second request from a second participant of the videoconference to hide a video stream associated with the second participant, wherein the second participant is included within the group of participants;
   in response to receiving the second request, hiding the video stream associated with the second participant; and
   upon expiry of the delay period, initiating the image capture utility for use by the first participant of the videoconference during the videoconference.

14. The computing system of claim 13 wherein notifying at least a portion of the group of participants includes:
   providing an audible notification to at least a portion of the group of participants.

15. The computing system of claim 13 wherein notifying at least a portion of the group of participants includes:
   providing a graphical notification to at least a portion of the group of participants.

16. The computing system of claim 13 wherein notifying at least a portion of the group of participants includes:
   providing a text-based notification to at least a portion of the group of participants.

17. The computing system of claim 13, further configured to perform operations comprising:
   receiving a third request from a third participant of the videoconference to hide a video stream associated with the third participant, wherein the third participant is included within the group of participants.

18. The computing system of claim 17 further configured to perform operations comprising:
   hiding the video stream associated with the third participant.

19. The computing system of claim 13 wherein notifying at least a portion of the group of participants of the intent of the first participant to initiate the image capture utility comprises selecting a notification to present to each participant based on a number of times that the respective participant has been presented with a notification.

20. The computing system of claim 13 further configured to initiate the delay period when a new participant joins the group.

* * * * *